United States Patent
Hoffmann et al.

(10) Patent No.: US 7,823,417 B2
(45) Date of Patent: Nov. 2, 2010

(54) METHOD OF MANUFACTURING HIGH PERFORMANCE GLASS FIBERS IN A REFRACTORY LINED MELTER AND FIBER FORMED THEREBY

(75) Inventors: Douglas A. Hoffmann, Hebron, OH (US); Peter B. McGinnis, Gahanna, OH (US)

(73) Assignee: OCV Intellectual Capital, LLC DE (US)

( * ) Notice: Subject to any disclaimer, the term of this patent is extended or adjusted under 35 U.S.C. 154(b) by 884 days.

(21) Appl. No.: 11/267,702

(22) Filed: Nov. 4, 2005

(65) Prior Publication Data

US 2007/0105701 A1 May 10, 2007

(51) Int. Cl.
C03B 3/00 (2006.01)
C03B 5/00 (2006.01)
C03C 3/085 (2006.01)
C03C 13/06 (2006.01)

(52) U.S. Cl. ............... 65/335; 65/347; 65/454; 65/462; 501/35; 501/36; 501/69

(58) Field of Classification Search ............ 501/35, 501/36, 69; 65/335, 347, 454, 462
See application file for complete search history.

(56) References Cited

U.S. PATENT DOCUMENTS

| | | | |
|---|---|---|---|
| 3,189,471 A | 6/1965 | Thomas | |
| 3,402,055 A | 9/1968 | Harris et al. | |
| 3,484,259 A | 12/1969 | Lewis et al. | |
| 3,524,738 A | 8/1970 | Grubb et al. | |
| 3,535,096 A | 10/1970 | Bour et al. | |
| 3,804,646 A | 4/1974 | Dumbaugh, Jr. | |
| 3,861,926 A | 1/1975 | Irlam et al. | |
| 3,887,386 A | 6/1975 | Majumdar | |
| 3,892,581 A | 7/1975 | Burgman et al. | |
| 3,904,423 A | 9/1975 | Guthrie | |
| 3,945,838 A | 3/1976 | Erickson et al. | |
| 4,063,001 A | 12/1977 | Zlochower | |
| 4,199,364 A * | 4/1980 | Neely | 501/35 |
| 4,325,724 A * | 4/1982 | Froberg | 65/474 |
| 4,366,251 A | 12/1982 | Rapp | |
| 4,375,527 A | 3/1983 | Zahner | |
| 4,491,951 A | 1/1985 | Dunn | |
| 4,582,748 A | 4/1986 | Eastes | |
| 4,764,487 A | 8/1988 | Lewis | |
| 4,857,485 A | 8/1989 | Brennan et al. | |
| 4,892,846 A * | 1/1990 | Rogers et al. | 501/8 |
| 4,935,291 A | 6/1990 | Gunnink | |
| 4,976,587 A | 12/1990 | Johnston et al. | |
| 5,302,444 A | 4/1994 | Jackson et al. | |
| 5,332,699 A | 7/1994 | Olds et al. | |
| 5,474,425 A | 12/1995 | Lawlor | |
| 5,569,629 A | 10/1996 | TenEyck et al. | |
| 5,576,252 A | 11/1996 | Rapp et al. | |
| 5,585,312 A | 12/1996 | TenEyck et al. | |
| 5,789,329 A | 8/1998 | Eastes et al. | |
| 5,851,932 A | 12/1998 | Dickson et al. | |
| 5,935,886 A | 8/1999 | Jensen et al. | |
| 5,948,535 A | 9/1999 | Chiurlo et al. | |
| 5,962,354 A | 10/1999 | Fyles et al. | |
| 5,997,977 A | 12/1999 | Zou et al. | |
| 6,063,470 A | 5/2000 | Zou et al. | |
| 6,101,847 A | 8/2000 | Shamp | |
| 6,136,735 A | 10/2000 | Gallo et al. | |
| 6,214,429 B1 | 4/2001 | Zou et al. | |
| 6,237,369 B1 * | 5/2001 | LeBlanc et al. | 65/134.1 |
| 6,248,678 B1 | 6/2001 | Pinckney | |
| 6,306,786 B1 | 10/2001 | Koyama et al. | |
| 6,314,760 B1 * | 11/2001 | Chenoweth | 65/135.1 |
| 6,329,310 B1 | 12/2001 | Peuchert et al. | |
| 6,376,403 B1 | 4/2002 | Koyama et al. | |
| 6,399,527 B1 | 6/2002 | Kishimoto et al. | |
| 6,457,943 B1 | 10/2002 | Olsen et al. | |
| 6,540,508 B1 * | 4/2003 | Simpson et al. | 431/154 |
| 6,579,599 B1 | 6/2003 | Blum et al. | |
| 6,686,304 B1 | 2/2004 | Wallenberger | |
| 6,809,050 B1 * | 10/2004 | McGinnis | 501/35 |
| 6,933,045 B2 | 8/2005 | Tamura | |
| 6,933,252 B2 | 8/2005 | Pierce | |
| 6,998,361 B2 | 2/2006 | Lewis | |
| 7,259,118 B2 | 8/2007 | Jubb et al. | |
| 7,285,510 B2 | 10/2007 | Sakaguchi et al. | |

(Continued)

FOREIGN PATENT DOCUMENTS

| | | |
|---|---|---|
| GB | 428 720 A | 5/1935 |
| JP | 58 064243 A | 4/1983 |
| WO | WO 2004/094794 | 11/2004 |
| WO | WO 2007/055964 | 5/2007 |
| WO | WO 2007/055968 | 5/2007 |

OTHER PUBLICATIONS

Thomson Scientific, London, GB; AN 1983-50368K Database WPI Week 198321.

*Primary Examiner*—Karl E Group
*Assistant Examiner*—Elizabeth A Bolden
(74) *Attorney, Agent, or Firm*—Joan N. Drew

(57) ABSTRACT

A method of forming high strength glass fibers in a refractory lined glass melter is disclosed. The refractory lined melter is suited to the batch compositions disclosed for the formation high modulus, and high-strength glass fibers. The glass composition for use in the method of the present invention is up to about 70.5 Weight % $SiO_2$, 24.5 weight % $Al_2O_3$, 22 weight % alkaline earth oxides and may include small amounts of alkali metal oxides and $ZrO_2$. Oxide based refractories included alumina, chromic oxide, silica, alumina-silica, zircon, zirconia-alumina-silica and combinations thereof. By using oxide based refractory lined furnaces the cost of production of glass fibers is substantially reduced in comparison with the cost of fibers using a platinum lined melting furnace. Fibers formed by the present invention are also disclosed.

15 Claims, 4 Drawing Sheets

U.S. PATENT DOCUMENTS

| | | |
|---|---|---|
| 7,449,419 B2 * | 11/2008 | Li .................. 501/36 |
| 2002/0000101 A1 | 1/2002 | Chenoweth |
| 2002/0045528 A1 | 4/2002 | Kusuno et al. |
| 2003/0077178 A1 | 4/2003 | Stearns |
| 2003/0100431 A1 | 5/2003 | Koyo et al. |
| 2003/0166446 A1 | 9/2003 | Lewis |
| 2003/0188554 A1 | 10/2003 | Baker et al. |
| 2003/0207748 A1 | 11/2003 | Wallenberger |
| 2003/0224922 A1 * | 12/2003 | Wallenberger .............. 501/35 |
| 2004/0092379 A1 | 5/2004 | Lewis |
| 2005/0014624 A1 | 1/2005 | Jubb et al. |
| 2005/0031703 A1 | 2/2005 | Beier et al. |
| 2005/0084440 A1 | 4/2005 | Chacon et al. |
| 2005/0085369 A1 | 4/2005 | Jensen |
| 2005/0090377 A1 | 4/2005 | Shelestak et al. |
| 2005/0130825 A1 | 6/2005 | Kravchenko et al. |
| 2005/0232828 A1 | 10/2005 | Merry |
| 2005/0234216 A1 | 10/2005 | Klein et al. |
| 2006/0001005 A1 | 1/2006 | Kishimoto et al. |
| 2006/0003884 A1 | 1/2006 | Nishizawa et al. |
| 2006/0257240 A1 | 11/2006 | Naskali et al. |
| 2007/0105701 A1 | 5/2007 | Hoffmann et al. |
| 2007/0107220 A1 | 5/2007 | Bakhuis et al. |
| 2008/0009403 A1 | 1/2008 | Hofmann et al. |
| 2008/0053152 A1 | 3/2008 | Kurachi et al. |

* cited by examiner

METHOD OF MANUFACTURING HIGH PERFORMANCE GLASS FIBERS IN A REFRACTORY LINED MELTER AND FIBER FORMED THEREBY

TECHNICAL FIELD AND INDUSTRIAL APPLICABILITY OF THE INVENTION

The present invention is generally directed to a method of manufacturing continuous glass fibers for use in high-strength applications and fibers made thereby.

BACKGROUND OF THE INVENTION

The most common glass composition for making continuous glass fiber strands is "E-Glass." The liquidus temperature of E-Glass is approximately 2100° F. (1149° C.) or lower. One advantage of E-Glass is that its liquidus temperature allows operating temperatures for producing glass fibers to be approximately 1900° F. to 2400° F. (1038° C. to 1316° C.). The ASTM classification for E-glass fiber yarns used in printed circuit boards and aerospace applications defines the composition to be 52 to 56 weight % $SiO_2$, 16 to 25 weight % CaO, 12 to 16 weight % $Al_2O_3$, 5 to 10 weight % $B_2O_3$, 0 to 5 weight % MgO, 0 to 2 weight % $Na_2O$ and $K_2O$, 0 to 0.8 weight % $TiO_2$, 0.05 to 0.4 weight % $Fe_2O_3$ and 0 to 1.0 weight % Fluorine.

Boron-free fibers are sold under the trademark ADVANTEX (Owens Corning, Toledo, Ohio, USA). Boron-Free fibers, such as are disclosed in U.S. Pat. No. 5,789,329, incorporated herein by reference in its entirety, offer a significant improvement in operating temperatures over boron-containing E-glass. Boron-Free glass fibers fall under the ASTM definition for E-glass fibers for use in general-use applications.

S-Glass is a family of glasses composed primarily of the oxides of magnesium, aluminum, and silicon with a chemical composition that produces glass fibers having a higher mechanical strength than E-Glass fibers. The composition for forming S-Glass includes approximately 65 weight % $SiO_2$, 25 weight % $Al_2O_3$, and 10 weight % MgO. S-glass has a composition that was originally designed to be used in high-strength applications such as ballistic armor.

R-Glass is a family of glasses that are composed primarily of the oxides of silicon, aluminum, magnesium, and calcium with a chemical composition that produces glass fibers with a higher mechanical strength than E-Glass fibers. R-Glass has a composition that contains approximately 58-60 weight % $SiO_2$, 23.5-25.5 weight % $Al_2O_3$, 14-17 weight % CaO plus MgO, 0% $B_2O_3$, 0% $F_2$ and less than 2 weight % miscellaneous components. R-Glass contains more alumina and silica than E-Glass and requires higher melting and processing temperatures during fiber forming. Typically, the melting and processing temperatures for R-Glass are at least 160° C. higher than those for E-Glass. This increase in processing temperature requires the use of a high-cost platinum-lined melter. In addition, the close proximity of the liquidus temperature to the forming temperature in R-Glass requires that the glass be fiberized at a viscosity lower than E-Glass, which is customarily fiberized at or near 1000 poise. Fiberizing R-Glass at the customary 1000 poise viscosity would likely result in glass devitrification, which causes process interruptions and reduced productivity.

Tables IA-IE set forth the compositions for a number of conventional high-strength glass compositions.

TABLE I-A

| Constituent | Chinese High Strength glass | RUSSIAN CONTINUOUS ROVING MAGNESIUM ALUMINOSILICATE | NITTOBO "T" Glass Fabric "B" | NITTOBO "T" Glass Fabric (Yarn) "C" |
|---|---|---|---|---|
| $SiO_2$ | 55.08 | 55.81 | 64.58 | 64.64 |
| CaO | 0.33 | 0.38 | 0.44 | 0.40 |
| $Al_2O_3$ | 25.22 | 23.78 | 24.44 | 24.57 |
| $B_2O_3$ | 1.85 | | 0.03 | 0.03 |
| MgO | 15.96 | 15.08 | 9.95 | 9.92 |
| $Na_2O$ | 0.12 | 0.063 | 0.08 | 0.09 |
| Fluorine | 0.03 | | 0.034 | 0.037 |
| $TiO_2$ | 0.023 | 2.33 | 0.019 | 0.018 |
| $Fe_2O_3$ | 1.1 | 0.388 | 0.187 | 0.180 |
| $K_2O$ | 0.039 | 0.56 | 0.007 | 0.010 |
| $ZrO_2$ | 0.007 | 0.15 | | |
| $Cr_2O_3$ | | 0.011 | 0.003 | 0.003 |
| $Li_2O$ | | 1.63 | | |
| $CeO_2$ | | | | |

TABLE I-B

| Constituent | Nitto Boseki A&P Yarn | Nitto Boseki NT6030 Yarn | Nitto Boseki TE Glass RST-220PA-535CS | Vetrotex Saint Gobain SR Glass Stratifils SR CG 250 P109 | Polotsk STEKLOVOLOKNO High Strength Glass |
|---|---|---|---|---|---|
| $SiO_2$ | 65.51 | 64.60 | 64.20 | 63.90 | 58.64 |
| CaO | 0.44 | 0.58 | 0.63 | 0.26 | 0.61 |
| $Al_2O_3$ | 24.06 | 24.60 | 25.10 | 24.40 | 25.41 |
| $B_2O_3$ | | | | | 0.04 |
| MgO | 9.73 | 9.90 | 9.90 | 10.00 | 14.18 |
| $Na_2O$ | 0.04 | 0.06 | 0.020 | 0.039 | 0.05 |
| Fluorine | 0.07 | | | | 0.02 |

TABLE I-B-continued

| Constituent | Nitto Boseki A&P Yarn | Nitto Boseki NT6030 Yarn | Nitto Boseki TE Glass RST-220PA-535CS | Vetrotex Saint Gobain SR Glass Stratifils SR CG 250 P109 | Polotsk STEKLOVOLOKNO High Strength Glass |
|---|---|---|---|---|---|
| $TiO_2$ | 0.016 | 0.000 | 0.000 | 0.210 | 0.624 |
| $Fe_2O_3$ | 0.067 | 0.079 | 0.083 | 0.520 | 0.253 |
| $K_2O$ | 0.020 | 0.020 | 0.020 | 0.540 | 0.35 |
| $ZrO_2$ | 0.079 | | | | |
| $Cr_2O_3$ | 0.0010 | | | 0.001 | 0.023 |
| $Li_2O$ | | | | | |
| $CeO_2$ | | | | | |

TABLE I-C

| Constituent | Chinese High Strength Yarn (8 micron) | Chinese High Strength Glass Roving | Zentron S-2 Glass Roving | SOLAIS Glass Sample | Advanced Glass Yarns R Glass |
|---|---|---|---|---|---|
| $SiO_2$ | 55.22 | 55.49 | 64.74 | 64.81 | 58.46 |
| CaO | 0.73 | 0.29 | 0.14 | 0.55 | 9.39 |
| $Al_2O_3$ | 24.42 | 24.88 | 24.70 | 24.51 | 24.55 |
| $B_2O_3$ | 3.46 | 3.52 | | 0.02 | 0.04 |
| MgO | 12.46 | 12.28 | 10.24 | 9.35 | 5.91 |
| $Na_2O$ | 0.104 | 0.06 | 0.17 | 0.16 | 0.079 |
| Fluorine | 0.07 | | | 0.02 | 0.054 |
| $TiO_2$ | 0.32 | 0.36 | 0.015 | 0.04 | 0.196 |
| $Fe_2O_3$ | 0.980 | 0.930 | 0.045 | 0.238 | 0.400 |
| $K_2O$ | 0.240 | 0.150 | 0.005 | 0.03 | 0.67 |
| $ZrO_2$ | | | | | |
| $Cr_2O_3$ | 0.0050 | | | 0.007 | 0.005 |
| $Li_2O$ | 0.59 | 0.63 | | | |
| $CeO_2$ | 1.23 | 1.25 | | | |

TABLE I-D

| Constituent | Advanced Glass Yarns S Glass | Culimeta Roving | IVG Vertex B96 675 Yarn | IVG Vertex Glass Roving | IVG Vertex Outside #1 Glass Roving |
|---|---|---|---|---|---|
| $SiO_2$ | 64.61 | 59.37 | 58.34 | 58.58 | 58.12 |
| CaO | 0.17 | 0.27 | 0.31 | 0.30 | 0.31 |
| $Al_2O_3$ | 24.84 | 25.49 | 23.81 | 24.26 | 24.09 |
| $B_2O_3$ | 0.04 | 0.05 | | | |
| MgO | 10.11 | 13.47 | 14.99 | 15.02 | 15.36 |
| $Na_2O$ | 0.118 | 0.024 | 0.05 | 0.02 | 0.03 |
| Fluorine | 0.03 | | 0.04 | 0.04 | 0.04 |
| $TiO_2$ | 0.011 | 0.530 | 1.380 | 0.67 | 0.91 |
| $Fe_2O_3$ | 0.042 | 0.374 | 0.333 | 0.336 | 0.303 |
| $K_2O$ | | 0.48 | 0.42 | 0.28 | 0.29 |
| $ZrO_2$ | | 0.152 | 0.129 | 0.165 | 0.157 |
| $Cr_2O_3$ | 0.0050 | 0.0120 | 0.0100 | 0.0120 | 0.0120 |
| $Li_2O$ | | | | | |
| $CeO_2$ | | | | | |

TABLE I-E

| Constituent | IVG Vertex Outside #2 Glass Roving | RH CG250 P109 Glass Fiber Strand |
|---|---|---|
| $SiO_2$ | 58.69 | 58.54 |
| CaO | 0.29 | 9.35 |
| $Al_2O_3$ | 24.3 | 25.39 |
| $B_2O_3$ | | |
| MgO | 15.06 | 6.15 |
| $Na_2O$ | 0.03 | 0.10 |
| Fluorine | 0.04 | 0.16 |
| $TiO_2$ | 0.64 | 0.008 |
| $Fe_2O_3$ | 0.331 | 0.069 |
| $K_2O$ | 0.36 | 0.14 |
| $ZrO_2$ | 0.187 | 0.006 |
| $Cr_2O_3$ | 0.0130 | |
| $Li_2O$ | | |
| $CeO_2$ | | |

R-Glass and S-Glass are produced by melting the constituents of the compositions in a platinum-lined melting container. The costs of forming R-Glass and S-Glass fibers are dramatically higher than E-Glass fibers due to the cost of producing the fibers in such melters. Thus, there is a need in the art for methods of forming glass compositions useful in the formation of high performance glass fibers from a direct-melt process in a refractory-lined furnace and fibers formed by the method.

SUMMARY OF THE INVENTION

The invention, in part, is a method of manufacturing a glass composition for the formation of continuous glass fibers that are suitable for use in high-strength applications. The composition useful in the present invention may be inexpensively formed into glass fibers using low-cost, direct melting in refractory-lined furnaces due to the relatively low fiberizing temperature of the glass fibers. Once formed into fibers, the glass composition provides the strength characteristics of higher-priced glass fibers such as S-Glass. The composition of the present invention includes about 60.5 to about 70.5 weight % $SiO_2$, about 10.0 to about 24.5 weight % $Al_2O_3$, about 6.0 to about 20.0 weight % RO, where RO equals the sum of MgO, CaO, SrO and BaO, and about 0.0 to about 3.0 weight % alkali metal oxides. In a preferred embodiment, the glass composition is composed of about 61 to about 68 weight % $SiO_2$, about 15 to about 19 weight % $Al_2O_3$, about 15 to about 20 weight % RO, where RO equals the sum of MgO, CaO, SrO and BaO, and about 0 to about 3 weight % alkali metal oxides. The composition preferably does not contain more than about 4 weight % of oxides or halogens selected from the group consisting of ZnO, $SO_3$, Fluorine, $B_2O_3$, $TiO_2$, $ZrO_2$ and $Fe_2O_3$. The desired properties of the high performance composite fibers manufactured by the present invention include a fiberizing temperature of less than about 2650° F. and a liquidus temperature that is preferably below the fiberizing temperature by at least about 80° F., more preferably by at least about 120° F., and most preferably by at least about 150° F.

The present invention includes a process for producing refined glass from a raw glass batch in a refractory lined glass melter. The process includes charging a raw glass batch to a melting zone of a glass melter, melts the raw glass batch within the melting zone and forming fibers from the melt. The present invention also includes fibers formed by such a method

DETAILED DESCRIPTION AND PREFERRED EMBODIMENTS OF THE INVENTION

Figure 1:
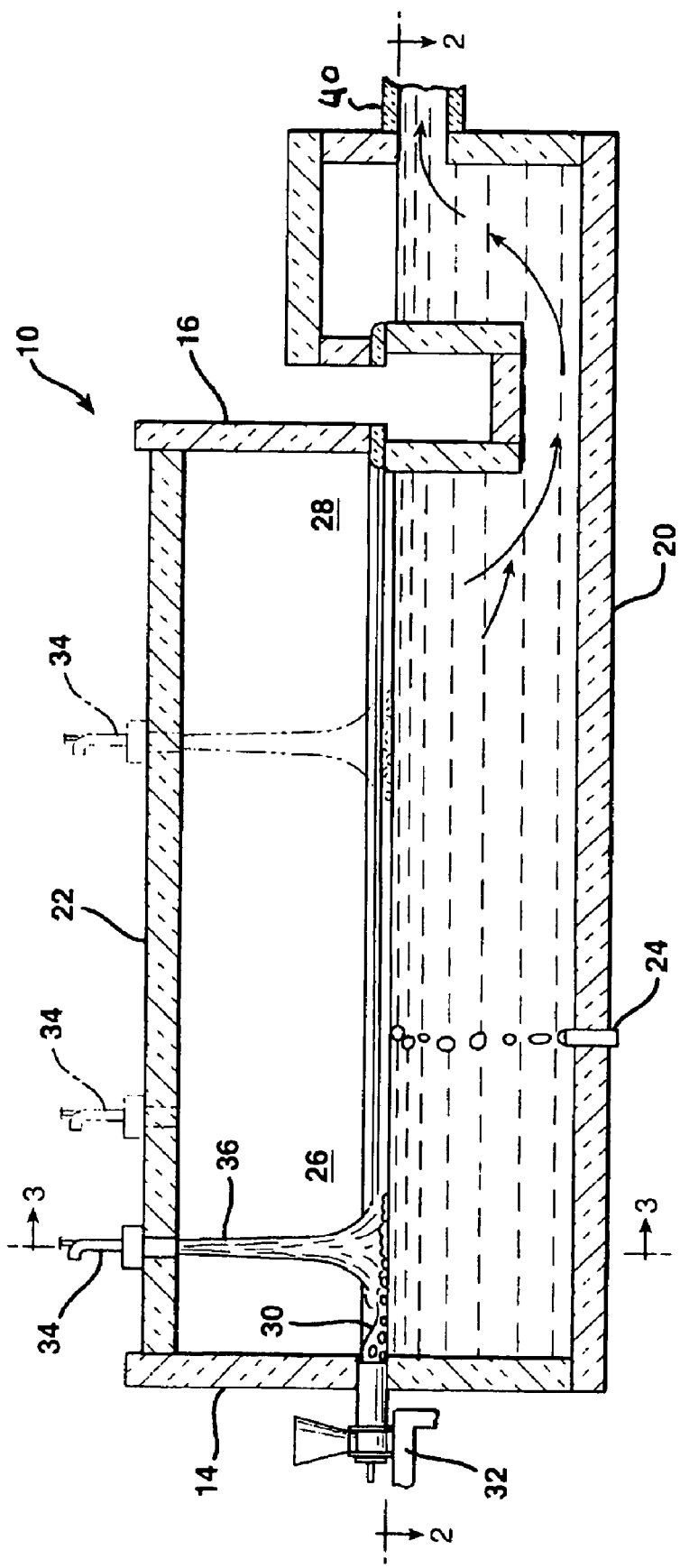
FIG. 1 is a cross-sectional longitudinal view of a glass melting furnace useful with the method of the present invention.
Figure 2:
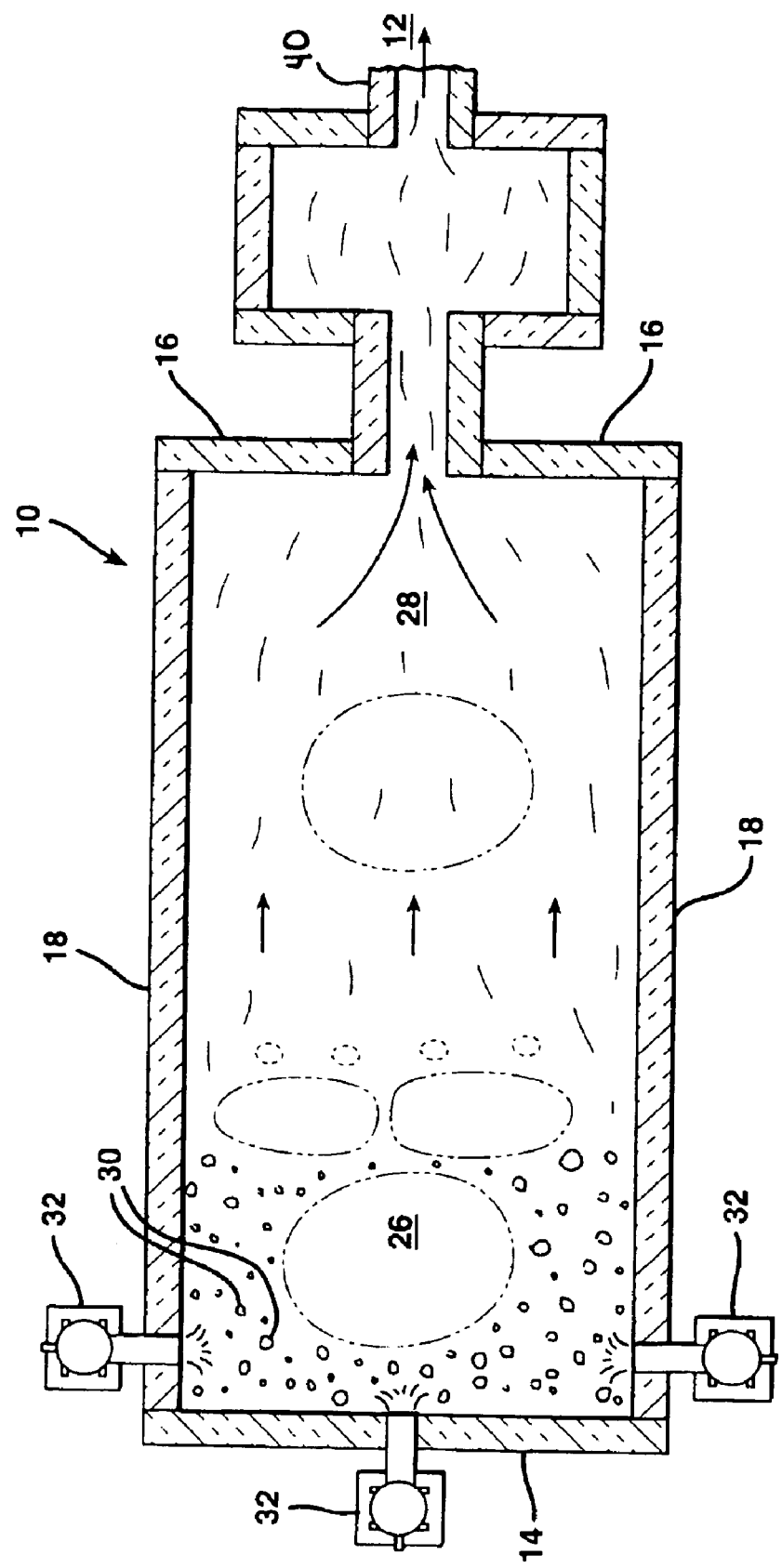
FIG. 2 is a cross-sectional plan view of the glass melting furnace of FIG. 1 taken along line 2-2.
Figure 3:
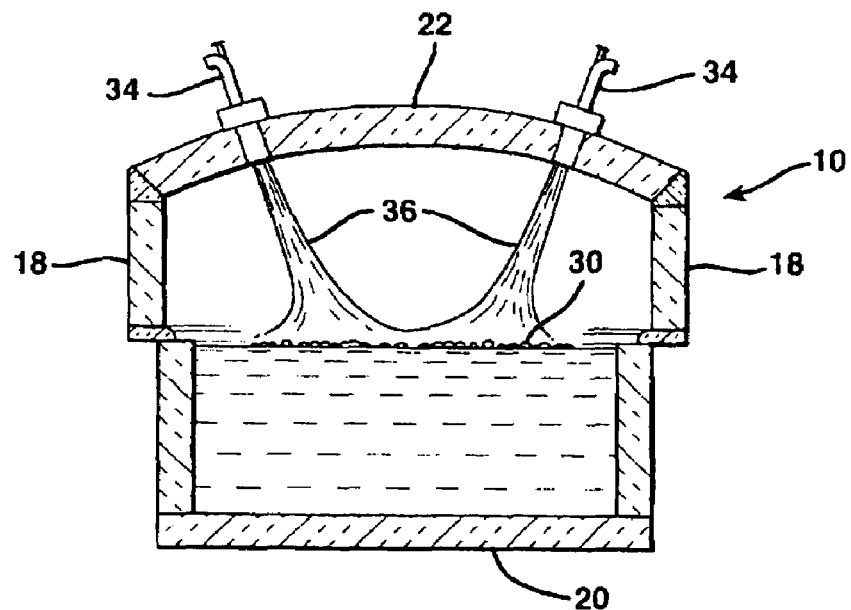
FIG. 3 is a cross-sectional view of the glass melting furnace of FIG. 1 taken along line 3-3 illustrating two burners adjacent the upstream end wall of the furnace.

Fiberizing properties of the glass composition used to form the glass fibers utilized in the method of the present invention include the fiberizing temperature, the liquidus, and delta-T. The fiberizing temperature is defined as the temperature that corresponds to a viscosity of about 1000 Poise. As discussed in more detail below, a lowered fiberizing temperature reduces the production cost of the fibers, allows for a longer bushing life, increases throughput, permits the glass to be melted in a refractory-lined melter, and reduces energy usage. For example, at a lower fiberizing temperature, a bushing operates at a cooler temperature and does not "sag" as quickly. Sag is a phenomenon that occurs in bushings that are held at an elevated temperature for extended periods of time. By lowering the fiberizing temperature, the sag rate of the bushing may be reduced and the bushing life can be increased. In addition, a lower fiberizing temperature allows for a higher throughput since more glass can be melted in a given period at a given energy input. As a result, production cost is reduced. In addition, a lower fiberizing temperature will also permit glass formed with the inventive composition to be melted in a refractory-lined melter since both its melting and fiberizing temperatures are below the upper use temperatures of many commercially available refractories.

The liquidus is defined as the highest temperature at which equilibrium exists between liquid glass and its primary crystalline phase. At all temperatures above the liquidus, the glass is free from crystals in its primary phase. At temperatures below the liquidus, crystals may form.

Another fiberizing property is delta-T ($\Delta T$), which is defined as the difference between the fiberizing temperature and the liquidus. A larger $\Delta T$ offers a greater degree of flexibility during the formation of the glass fibers and helps to inhibit devitrification of the glass (that is, the formation of crystals within the melt) during melting and fiberizing. Increasing the $\Delta T$ also reduces the production cost of the glass fibers by allowing for a greater bushing life and by providing a wider process window for forming fibers.

The glasses of the present invention are suitable for melting in traditional commercially available refractory-lined glass melters which are widely used in the manufacture of glass reinforcement fibers. Starting batch components typically include $SiO_2$ (ground silica sand), and $Al_2O_3$ (calcined alumina), as well as chain modifiers from source materials such as $MgCO_3$ (magnesite), $CaCO_3$ (limestone), $SrCO_3$ (strontianite), $BaCO_3$ (witherite), $ZrSiO_4$ (zircon), and $Na_2CO_3$ (natrite).

FIGS. 1-4 depict a glass melting furnace 10 useful in the method of forming the glass fibers described herein and set forth in the examples and claims below. The glass melting furnace 10 provides molten glass to a glass forehearth 12. The molten glass is preferably composed of about 60.5 to about 70.5 weight percent $SiO_2$, about 10.0 to about 24.5 weight percent $Al_2O_3$, about 6.0 to about 20.0 weight percent RO, where RO equals the sum of MgO, CaO, and SrO, and about 0.0 to about 3.0 weight percent alkali metal oxides. A fiber formed in accordance with the present invention will typically include small amounts of ZnO, $SO_3$, Fluorine, $B_2O_3$, $TiO_2$ and $Fe_2O_3$, preferably in an amount of less than about 4 weight percent. In addition, a fiber formed in accordance with the method and composition of the present invention will preferably having a fiberizing temperature of less than about 2650° F., a ΔT of at least about 80° F., preferably a ΔT of at least about 120° F., and most preferably a ΔT of at least about 150° F., and a coefficient of thermal expansion (CTE) of about $2.28 \times 10^{-6}$ in/in/° F. to about $2.77 \times 10^{-6}$ in/in/° F. Further, the glass fibers manufactured by the method of the present invention preferably have a strength in excess of about 600 KPSI, preferably a strength in excess of about 630 KPSI, and most preferably a strength in excess of about 695 KPSI. Further, the glass fibers will desirably have a modulus greater than about 12.0 MPSI, preferably greater then about 12.18 MPSI, and most preferably greater then about 12.6 MPSI. It will be appreciated that certain details of construction are not provided in view of such details being conventional and well within the skill of the art.

The method of the present invention is preferably performed using the glass melting furnace 10, which includes an elongated channel having an upstream end wall 14a, a downstream end wall 16, side walls 18, a floor 20, and a roof 22. Each of the components of the glass melting furnace 10 are made from appropriate refractory materials such as alumina, chromic oxide, silica, alumina-silica, zircon, zirconia-alumina-silica, or similar oxide-based refractory materials. The roof 22 is shown generally as having an arcuate shape transverse to the longitudinal axis of the composition the channel; however, the roof may have any suitable design. The roof 22 is typically positioned between about 3-10 feet above the surface of the glass batch composition 30. The glass batch material 30 is a mixture of raw materials used in the manufacture of glass in the accordance with the present invention. The glass melting furnace 10 may optionally include one more bubblers 24 and/or electrical boost electrodes (not shown). The bubblers 24 and/or electrical boost electrodes increase the temperature of the bulk glass and increase the molten glass circulation under the batch cover.

In addition, the glass melting furnace 10 may include two successive zones, an upstream melting zone 26 and a downstream refining zone 28. In the melting zone 26, the glass batch composition 30 may be charged into the furnace using a charging device 32 of a type well-known in the art.

In one suitable melter configuration, the glass batch material 30 forms a batch layer of solid particles on the surface of the molten glass in the melting zone 26 of the glass melting furnace 10. The floating solid batch particles of the glass batch composition 30 are at least partially melted by at least one burner 34 having a controlled flame shape and length mounted within the roof 22 of the glass melting furnace 10.

Figure 4:
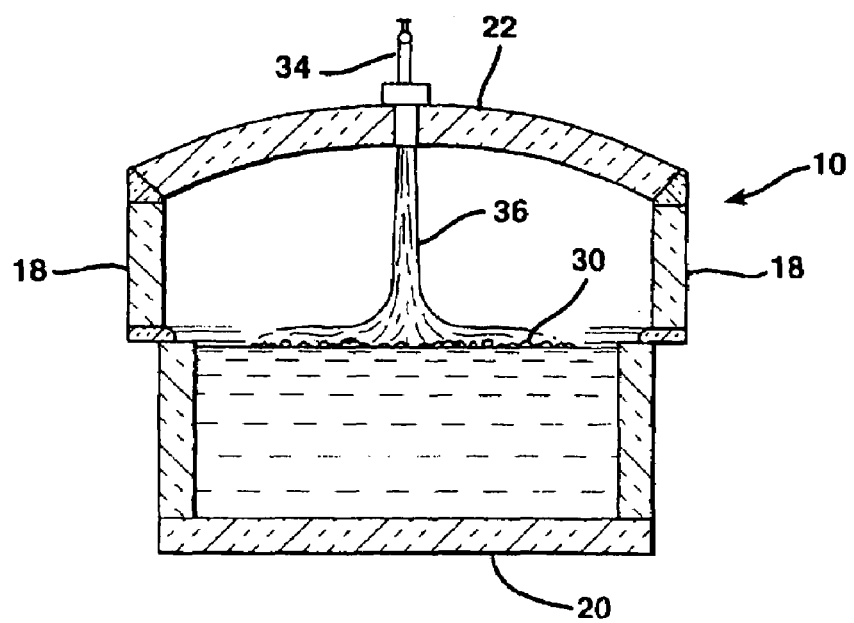
FIG. 4 is an alternate cross-sectional plan view of the glass melting furnace of FIG. 1 taken along line 3-3 illustrating one burner adjacent the upstream end wall of the furnace.

In one preferred embodiment, as shown in FIG. 1, the glass melting furnace 10 includes three burners 34. A single burner 34 is positioned upstream of two adjacently positioned downstream burners 34. However, it will be appreciated that any number of burners 34 may be positioned at any suitable location in the roof 22 of the furnace 10 over the batch to melt the glass batch composition 30. For example, two burners 34 may be positioned in a side-by-side relationship (FIG. 3) or a single burner may be used (FIG. 4).

Other conventional melters may be used without departing from the present invention. Conventional melters include Air-Gas melters, Oxygen-Gas melters, electrically fired melters, or any fossil fuel fired melter. It is possible to add electric boost or bubblers to any of the melting processes. It is also possible to include a separate refining zone (as shown in FIG. 1 or incorporate the refining zone into the main tank of the melter.

Figure 5:
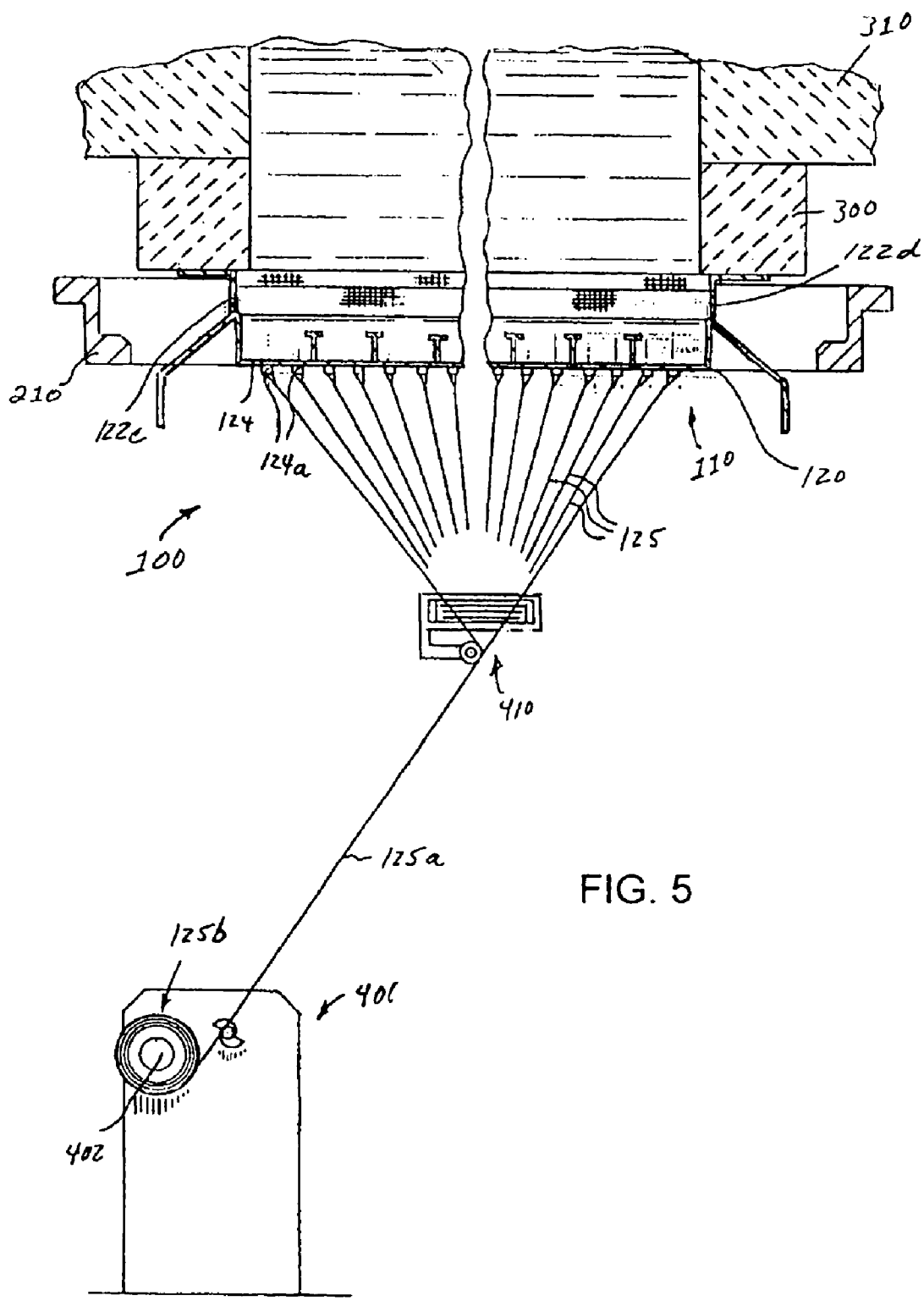
FIG. 5 is a side view, partially in cross section, of a bushing assembly/support structure arrangement for producing continuous glass filaments useful in the method of the present invention.

As shown in FIG. 5, a bushing assembly 100 includes a bushing 110 and a bushing frame 210. The bushing 110 includes a bushing main body 120 with sidewalls 122 and a tip plate 124 extending between the sidewalls 122. The main body 120 is positioned below a bushing block 300 that, in turn, is positioned beneath a forehearth 310. In practicing the method of the present invention, a stream of molten glass is received by the main body 120 from the forehearth 310. The forehearth 310 receives the molten glass from a melter 10 (shown in FIG. 1). A delivery channel 40 is positioned between the melter 10 and the forehearth 310 to deliver the molten glass batch composition 30 from the melter 10 to the forehearth 310. The forehearth 310 and bushing block 300 may be conventional in construction and may be formed from refractory materials.

The tip plate 124 contains a plurality of nozzles 124a (also referred to herein as orifices) through which a plurality of streams of molten glass may be discharged. The streams of molten material may be mechanically drawn from the tip plate 124 to form continuous filaments 125 via a conventional winder device 400. The filaments 125 may be gathered into a single continuous strand 125a after having received a protective coating of a sizing composition from a sizing applicator 410. The continuous filaments 125a may be wound onto a rotating collet 402 of the winder device 400 to form a package 125b. The continuous filaments 125 may also be processed into other desired composite glass materials including, without limitation, wet used chopped strand fibers, dry use chopped strand fibers, continuous filament mats, chopped strand mats, wet formed mats or air laid mats.

Having generally described this invention, a further understanding can be obtained by reference to certain specific examples illustrated below which are provided for purposes of illustration only and are not intended to be all inclusive or limiting unless otherwise specified.

EXAMPLES

The glasses in the examples listed in Tables IIA-IIC were melted in platinum crucibles or in a continuous platinum-lined melter for determining the mechanical and physical properties of the glass and fibers produced therefrom. The units of measurement for the physical properties are: Viscosity (° F.), Liquidus temperature (° F.) and ΔT (° F.). In some examples the glasses were fiberized and Strength (KPsi), Density (g/cc), Modulus (MPsi), Softening Point (° F.) and coefficient of thermal expansion (CTE) (in/in/(° F.)) were measured.

The fiberizing temperature was measured using a rotating spindle viscometer. The fiberizing viscosity is defined as 1000 Poise. The liquidus was measured by placing a platinum container filled with glass in a thermal gradient furnace for 16 hours. The greatest temperature at which crystals were present was considered the liquidus temperature. The modulus was measured using the sonic technique on a single fiber of glass. The tensile strength was measured on a pristine single fiber. The CTE was measured with a dilatometer over the range of temperature from 25 to 600 degrees C. The softening point temperature was measured using the ASTM C338 fiber-elongation method.

TABLE IIA

| Glass | Ex. 1 | Ex. 2 | Ex. 3 | Ex. 4 | Ex. 5 | Ex. 6 |
|---|---|---|---|---|---|---|
| $SiO_2$ | 62.63 | 62.42 | 61.75 | 63.01 | 63.07 | 63.16 |
| CaO | 8.49 | 8.64 | 8.57 | 4.84 | 4.85 | 4.8 |
| $Al_2O_3$ | 18.50 | 18.54 | 18.82 | 19.99 | 20.03 | 19.76 |
| MgO | 9.47 | 9.64 | 9.65 | 11.26 | 11.28 | 11.33 |

TABLE IIA-continued

| Glass | Ex. 1 | Ex. 2 | Ex. 3 | Ex. 4 | Ex. 5 | Ex. 6 |
|---|---|---|---|---|---|---|
| Na$_2$O | 0.70 | 0.69 | | 0.70 | 0.70 | |
| TiO$_2$ | 0.00 | 0.01 | 0.01 | 0.00 | 0.01 | 0.02 |
| Fe$_2$O$_3$ | 0.20 | 0.05 | 0.045 | 0.20 | 0.05 | 0.037 |
| Measured Viscosity (° F.) | 2491 | na | na | 2514 | na | na |
| Measured Liquidus (° F.) | 2261 | 2247 | na | 2335 | na | na |
| Measured DT (° F.) | 230 | na | na | 179 | na | na |
| Measured Strength (KPsi) | 672 | na | na | 695 | na | na |
| Measured Density (g/cc) | 2.556 | na | na | 2.530 | na | na |
| Measured Modulus (MPsi) | 12.4 | 12.6 | na | 12.6 | 12.7 | na |
| Softening Point (° F.) | na | na | na | 1765 | na | na |
| CTE in/in/(° F.) | na | na | na | 2.28 × 10$^{-6}$ | na | na |

TABLE II-B

| Glass | Ex. 7 | Ex. 8 | Ex. 9 | Ex. 10 | Ex. 11 | Ex. 12 |
|---|---|---|---|---|---|---|
| SiO$_2$ | 62.32 | 63.89 | 63.14 | 61.39 | 61.39 | 65.00 |
| CaO | 11.56 | 11.21 | 11.96 | 11.96 | 8.71 | 13.00 |
| Al$_2$O$_3$ | 17.25 | 16.39 | 16.39 | 18.14 | 18.89 | 15.00 |
| MgO | 7.98 | 6.62 | 6.62 | 6.62 | 9.62 | 5.00 |
| Na$_2$O | 0.70 | 0.75 | 0.75 | 0.75 | 0.25 | 1.00 |
| TiO$_2$ | 0.00 | 0.75 | 0.75 | 0.75 | 0.75 | 1.00 |
| Fe$_2$O$_3$ | 0.20 | 0.39 | 0.39 | 0.39 | 0.39 | |
| Measured Viscosity (° F.) | 2458 | 2493 | 2435 | 2431 | 2434 | 2509 |
| Measured Liquidus (° F.) | 2301 | 2268 | 2294 | 2353 | 2261 | 2226 |
| Measured DT (° F.) | 157 | 225 | 141 | 78 | 173 | 283 |
| Measured Strength (KPsi) | 632 | 636 | 622 | 615 | 682 | 612 |
| Measured Density (g/cc) | 2.573 | 2.553 | 2.567 | 2.567 | 2.564 | na |
| Measured Modulus (MPsi) | 12.2 | 12.2 | 12.2 | 12.2 | 12.6 | na |
| Softening Point (° F.) | 1729 | na | na | na | na | na |
| CTE in/in/(° F.) | 2.77 × 10$^{-6}$ | na | na | na | na | na |

TABLE II-C

| Glass | Ex. 13 | Ex. 14 | Ex. 15 | Ex. 16 | Ex. 17 | Ex. 18 |
|---|---|---|---|---|---|---|
| SiO$_2$ | 63.89 | 65.00 | 64.00 | 63.89 | 65.00 | 65.00 |
| CaO | 6.96 | 14.00 | 4.00 | 8.96 | 14.00 | 12.50 |
| Al$_2$O$_3$ | 18.64 | 15.00 | 20.00 | 18.89 | 15.00 | 15.00 |
| MgO | 9.62 | 6.00 | 11.00 | 6.62 | 5.00 | 5.00 |
| Na$_2$O | 0.25 | 0.00 | 1.00 | 0.75 | 0.00 | 1.00 |
| TiO$_2$ | 0.25 | 0.00 | 0.00 | 0.75 | 1.00 | 1.00 |
| Fe$_2$O$_3$ | 0.39 | 0.00 | 0.00 | 0.14 | 0.00 | 0.50 |
| Measured Viscosity (° F.) | 2513 | 2508 | 2548 | 2565 | 2481 | 2523 |
| Measured Liquidus (° F.) | 2337 | 2373 | 2401 | 2288 | 2403 | 2227 |
| Measured DT (° F.) | 176 | 135 | 147 | 277 | 78 | 296 |
| Measured Strength (KPsi) | 695 | 624 | na | na | 604 | na |
| Measured Density (g/cc) | 2.480 | 2.554 | na | na | 2.546 | na |
| Measured Modulus (MPsi) | 12.3 | 12.0 | na | na | 11.9 | na |
| Softening Point (° F.) | na | na | na | na | na | na |
| CTE in/in/(° F.) | na | na | na | na | na | na |

As is understood in the art, the above exemplary inventive compositions do not always total 100% of the listed components due to statistical conventions (such as, rounding and averaging) and the fact that some compositions may include impurities that are not listed. Of course, the actual amounts of all components, including any impurities, in a composition always total 100%. Furthermore, it should be understood that where small quantities of components are specified in the compositions, for example, quantities on the order of about 0.05 weight percent or less, those components may be present in the form of trace impurities present in the raw materials, rather than intentionally added.

Additionally, components may be added to the batch composition, for example, to facilitate processing, that are later eliminated, thereby forming a glass composition that is essentially free of such components. Thus, for instance, minute quantities of components such as fluorine and sulfate may be present as trace impurities in the raw materials providing the silica, calcia, alumina, and magnesia components in commercial practice of the invention or they may be processing aids that are essentially removed during manufacture.

As apparent from the above examples, glass fiber compositions of the invention have advantageous properties, such as low fiberizing temperatures and wide differences between the liquidus temperatures and the fiberizing temperatures (high $\Delta T$ values). Other advantages and obvious modifications of the invention will be apparent to the artisan from the above description and further through practice of the invention). The high-performance glass of the present invention melts and refines at relatively low temperatures, has a workable viscosity over a wide range of relatively low temperatures, and a low liquidus temperature range.

The invention of this application has been described above both generically and with regard to specific embodiments. Although the invention has been set forth in what is believed to be the preferred embodiments, a wide variety of alternatives known to those of skill in the art can be selected within the generic disclosure. Other advantages and obvious modifications of the invention will be apparent to the artisan from the above description and further through practice of the invention. The invention is not otherwise limited, except for the recitation of the claims set forth below.

We claim:

1. A process for producing glass fibers from raw glass batch in a refractory lined glass melter, the process comprising the steps of:
    charging raw glass batch to the melting zone of the glass melter, the glass batch comprising:
        about 60.5 to about 70.5 weight percent $SiO_2$;
        about 10 to about 24.5 weight percent $Al_2O_3$;
        about 15.0 to about 20.0 weight percent RO, where RO equals the sum of MgO, CaO, SrO and BaO in the batch composition, 5 to 11.33 weight percent of the RO being MgO; and
        about 0 to about 3 weight percent alkali metal oxides;
    heating the glass batch to a forming temperature in excess of the liquidus temperature of a resulting glass to form a fiberizable molten glass; and
    fiberizing said molten glass.

2. The process of claim 1, wherein the glass batch comprises:
    less than 4 weight percent of compounds selected from the group consisting of ZnO, $SO_3$, Fluorine, $B_2O_3$, $TiO_2$ and $Fe_2O_3$.

3. The process of claim 1, wherein glass produced from said batch has a fiberizing temperature of less than about 2650° F., and a $\Delta T$ of at least about 80° F.

4. The process of claim 3 wherein glass produced from said batch has a $\Delta T$ of at least 120° F.

5. The process of claim 1, wherein the glass melter is lined with a refractory material selected from the group consisting essentially of alumina, silica, chromic oxide, alumina-silica, zircon, zirconia-alumina-silica and combinations thereof.

6. The process of claim 1, wherein glass produced from the batch is fiberized at a forming temperature of less than about 2650° F.

7. A process for producing glass from raw glass-forming material in a refractory lined glass melter, the glass melter having a roof, a bottom and side walls defining an elongated channel having a melting zone and a downstream refining zone, the process comprising the steps of:
    charging raw glass batch to the melting zone of the glass melter, the glass batch comprising:
        60.5-70.5 weight percent $SiO_2$;
        10-24.5 weight percent $Al_2O_3$;
        15.0 to 20.0 weight percent RO, where RO equals the sum of MgO, CaO, SrO and BaO in the batch composition, 5 to 11.33 weight percent of the RO being MgO; and
        0 to 3 weight percent alkali metal oxides; and
        0 to 3 weight percent $ZrO_2$
    providing at least one burner within the roof of the glass melter; and
    melting the glass batch to form a fiberizable molten glass.

8. The process of claim 7, wherein the glass melter is lined with a refractory material selected from the group consisting essentially of alumina, chromic oxide, silica, alumina-silica, zircon, zirconia-alumina-silica and combinations thereof.

9. The process of claim 7, wherein the glass produced from the batch is fiberized at a forming temperature of less than 2650° F.

10. A process for producing glass from a raw glass-forming material in a refractory lined glass melter; the glass melter having a root a bottom and side walls defining an elongated channel having a melting zone and a downstream refining zone, the process comprising the steps of:
    charging raw glass batch to the melting zone of the glass melter; the glass batch comprising:
        60.5-70.5 weight percent $SiO_2$;
        10-24.5 weight percent $Al_2O_3$;
        15.0 to 20.0 weight percent RO, where RO equals the sum of MgO, CaO, SrO and BaO in the batch composition, 5 to 11.33 weight percent of the RO being MgO; and
        0 to 3 weight percent alkali metal oxides providing at least one burner within the roof of the glass melter; and
    melting the glass batch to form a fiberizable molten glass.

11. The process of claim 10, wherein the glass melter is lined with a refractory material selected from the group consisting essentially of alumina, chromie oxide, silica, alumina-silica, zircon, zirconia-alumina-silica and combinations thereof 12. The process of claim 10, wherein the glass produced from the batch is fiberized at a foiming temperature of less than 2650° F.

13. The process of claim 10, wherein the glass batch comprises:
    less than 4 weight percent of compounds selected from the group consisting of ZnO, $ZrO_2$, $SO_3$, Fluorine, $B_2O_3$, $TiO_2$ and $Fe_2O_3$.

14. The process of claim 13, wherein the glass melter is lined with a refractory material selected from the group consisting essentially of alumina, chromic oxide, silica, alumina-silica, zircon, zirconia-alumina-silica and combinations thereof.

15. The process of claim 13, wherein the glass produced from the batch is fiberized at a forming temperature of less than 2650° F.

* * * * *